(12) United States Patent
Pringle

(10) Patent No.: US 7,101,464 B1
(45) Date of Patent: Sep. 5, 2006

(54) MICROWAVE PYROLYSIS APPARATUS FOR WASTE TIRES

(75) Inventor: Joe Allen Pringle, Mount Olive, NC (US)

(73) Assignee: The Tire Chief, Inc., Lubbock, TX (US)

( * ) Notice: Subject to any disclaimer, the term of this patent is extended or adjusted under 35 U.S.C. 154(b) by 0 days.

(21) Appl. No.: 08/853,604

(22) Filed: May 9, 1997

(51) Int. Cl.
*C10B 1/00* (2006.01)
*C10B 51/00* (2006.01)

(52) U.S. Cl. .......................... 202/113; 201/19; 201/25; 202/117; 202/124; 202/150; 202/105; 219/701

(58) Field of Classification Search ................ 201/25, 201/41, 19, 26, 2.5, 35; 202/117, 124, 113, 202/150, 149, 120, 105; 219/684, 696, 697, 219/698, 700, 701; 585/241; 134/105
See application file for complete search history.

(56) References Cited

U.S. PATENT DOCUMENTS

| | | | | |
|---|---|---|---|---|
| 3,843,457 A | * | 10/1974 | Grannen et al. | 201/2.5 |
| 4,065,361 A | * | 12/1977 | Hanson | 202/117 |
| 4,118,282 A | * | 10/1978 | Wallace | 201/25 |
| 4,456,806 A | * | 6/1984 | Arimatsu | 219/10.55 M |
| 4,826,573 A | * | 5/1989 | Schippers | 201/25 |
| 5,057,189 A | * | 10/1991 | Apffel | 202/113 |
| 5,084,141 A | * | 1/1992 | Holland | 201/19 |
| 5,167,772 A | * | 12/1992 | Parker, Sr. | 202/105 |
| 5,191,183 A | * | 3/1993 | Balbaa et al. | 219/10.55 M |
| 5,783,046 A | * | 7/1998 | Flanigan | 201/25 |

FOREIGN PATENT DOCUMENTS

| | | | | |
|---|---|---|---|---|
| JP | 0025874 | * | 7/1978 | 201/25 |
| JP | 0130678 | * | 7/1985 | 201/25 |
| JP | 0301230 | * | 11/1993 | |

* cited by examiner

*Primary Examiner*—Virginia Manoharan
(74) *Attorney, Agent, or Firm*—Stites & Harbison PLLC; Ross F. Hunt, Jr.

(57) ABSTRACT

A microwave distillation apparatus provides destructive distillation of whole waste tires. The apparatus includes a housing including a plurality of vertically arranged chambers. A preheat chamber provides preheating of a whole waste tire received therein. An irradiation chamber, located below the preheat chamber and thermally coupled to the preheat chamber such that heat generated in the irradiation chamber creates heat convection currents in the preheat chamber, receives a preheated whole waste tire from the preheat chamber. A microwave energy supply supplies microwave energy to the irradiation chamber to provide destructive distillation of a tire received in that chamber. A cooling chamber, located below the irradiation chamber, receives by-products of the destructive distillation therefrom and provides delivery of the by-products from the housing.

23 Claims, 3 Drawing Sheets

MICROWAVE PYROLYSIS APPARATUS FOR WASTE TIRES

FIELD OF THE INVENTION

The invention relates to an apparatus for providing microwave distillation of whole waste tires.

BACKGROUND OF THE INVENTION

The problems created by discarded or waste tires are well known. However, the problem continues to grow as more and more waste tires accumulate, thereby placing increasing pressure on landfills and waste dumps. It has been estimated that on the order of 250 million tires are discarded to become scrap or waste each year and that, over the years, billions of waste tires have accumulated.

A number of approaches have been taken in attempting to develop an efficient, cost effective and environmental acceptable way in which to dispose of tire scrap or waste. Many of these developments are the subject of patents, including the following U.S. Pat. Nos.: 3,843,457 to Grannen et al; 4,118,282 to Wallace; 4,647,443 (Apffel); 4,826,573 to Schippers; 4,839,151 to Apffel; 5,084,140, 5,084,141, 5,330,623, 5,387,321, and 5,364,821, all to Holland, 5,167,772 to Parker, Sr.; 5,316,224 to Dobozy; and 5,366,595 to Padgett et al. These patents themselves reference a number of other patents and other prior art of interest.

As indicated above and is explained in more detail below, the present invention employs microwave energy in the distillation of tires. Some of the patents listed above also use microwave energy for pyrolysis for various purposes. For example, the Apffel patents disclose a process for recovering char, oil and fuel gas for vehicle tires wherein the tires are first pyrolyzed using radiant heat to partially devolatize a major portion of the hydrocarbons in the tires and produce a char that can be separated from the steel, fiberglass and the like. The char can then be pyrolyzed with microwaves to devolatize the remaining hydrocarbons from the char as gas. A number of the Holland patents which relate to waste tire "compound" or scraps (e.g., U.S. Pat. Nos. 5,084,140, 5,084,141, and 5,330,623) disclose a process for the destructive distillation of such waste tire materials in bulk or chopped form wherein the materials are pre-heated without pyrolysis using a hot gas stream and then conveyed by a conveyor to a microwave discharge zone for pyrolysis. The Padgett et al. patent discloses an apparatus for pyrolyzing waste tires wherein the tires are placed in a rotating cylinder or drum and a microwave heating device is used to heat the material within the drum so as to break down the material into solid and fluid products.

The prior art processes and devices described above suffer a number of disadvantages. For example, relatively expensive high temperature equipment is often required, efficiencies are relatively low and costs relatively high, and, in some instances, environmental concerns are presented. Briefly considering the patents discussed specifically above, the use of radiant heat pyrolysis prior to microwave pyrolysis as in the Apffel patents has a number of drawbacks, including those discussed in some of the Holland patents (see, e.g., U.S. Pat. No. 5,084,141). Further, the processes disclosed in the Holland patents have disadvantages regarding cost and efficiency. For example, referring again to U.S. Pat. No. 5,084,141 to Holland, the use of straight line or linear conveyor belt and radiation chamber arrangement makes it difficult to provide microwave coverage of a whole tire and, in this regard, while the patent refers to the pyrolysis of tire material in bulk as well as in shredded form, the inline microwave energy pattern provided, as well as other aspects of the system, would appear to be specifically adapted to use with shredded tires or scrap tire chunks. The rotating metal drum arrangement of the Padgett et al. patent creates a number of problems, particularly with respect to establishing a stable standing wave ratio.

SUMMARY OF THE INVENTION

In accordance with the invention, a microwave distillation apparatus is provided which enables destructive distillation of whole waste tires in an efficient and effective manner and with minimal environmental impact. According to a preferred embodiment, the apparatus comprises: a housing comprising a plurality of vertically arranged chambers, the chambers including a preheat chamber for providing preheating of a whole waste tire received therein, and an irradiation chamber, located below the preheat chamber and thermally coupled to the preheat chamber such that heat generated in the irradiation chamber creates heat convection currents in the preheat chamber, for receiving a preheated whole waste tire from said preheat chamber; the apparatus further comprising microwave energy supply means for supplying microwave energy to the irradiation chamber to provide destructive distillation of a preheated whole waste tire received in the irradiation chamber.

Preferably, the chambers of the distillation apparatus further comprise a cooling chamber, located below the irradiation chamber, for receiving by-products of the destructive distillation and for providing delivery of these by-products from the housing. The cooling chamber preferably includes a closeable input opening in communication with the irradiation chamber, a closeable discharge opening and a conveyor for receiving the by-products from the irradiation chamber, and for conveying the by-products received thereby to the discharge opening. Advantageously, the discharge opening comprises a purge gate for, when open, providing discharge of the by-products. The cooling chamber preferably also includes means for removing fluids associated with the by-products from the cooling chamber.

Advantageously, the apparatus further comprises gate means for providing gravity feeding of tires from the preheat chamber to the irradiation chamber. The gate means preferably comprises a gate assembly providing a purge lock between the preheat chamber and the irradiation chamber. In a preferred implementation, the preheat chamber includes means for supplying a purge gas under a pressure above atmospheric pressure to the preheat chamber. Advantageously, the purge gas comprises nitrogen although other gases such as $CO_2$ can also be used. In this preferred implementation, the apparatus preferably further comprises means for maintaining the irradiation chamber at a pressure below that in the preheat chamber prior to the receipt of a tire therein from the preheat chamber so that the purge gas is transferred to the irradiation chamber when a tire is received therein.

In accordance with a further important aspect of the invention, the irradiation chamber comprises a tuned cavity. In an advantageous embodiment, the cavity or chamber is tuned to an odd multiple of the microwave frequency.

Preferably, the irradiation chamber includes at least one microwave transparent window therein through which the microwave energy is transmitted. Advantageously, the apparatus further comprises cleaning means, mounted in or on the irradiation chamber, for removing contaminants from the at least one window. The cleaning means preferably comprises ultrasonic cleaning means for providing vibratory cleaning of the at least one window.

The microwave energy supply means preferably comprises at least one waveguide having an output end terminating at a wall of the irradiation chamber, a microwave stirrer located at the output end of the at least one waveguide, and a microwave transparent window in the wall through which microwave energy is coupled from the waveguide into the irradiation chamber. The microwave energy supply means preferably comprises at least first and second waveguides positioned on opposite sides of the irradiation chamber for directing microwave energy into the irradiation chamber so as to irradiate both sides of a tire received in that chamber. In one preferred embodiment, the housing includes four microwave transparent windows in each of said opposite sides of said irradiation chamber and a microwave stirrer associated with each of the windows such that each stirrer covers one-fourth of one side of a tire. In an alternative preferred embodiment, two diagonally disposed microwave transparent windows and associated stirrers are located on each side of the chamber.

The irradiation chamber preferably includes means for supporting a tire substantially vertically therein so as to define a vertical plane and the microwave energy supply means transmits microwave energy substantially at a right angle to said vertical plane.

The irradiation chamber advantageously includes a conductive bottom support member on which a tire received in the irradiation chamber is supported so that belting of a belted tire received in that chamber is spaced from the bottom support member by any tread remaining on the tire and serves as microwave ground. The support member preferably comprises a porous microwave shield for blocking the passage of microwave energy and thereby assisting in confining of the microwave energy within the irradiation chamber, while permitting solid by-products of less than a predetermined size to pass therethrough. Advantageously, a purge lock gate assembly is disposed below said microwave shield.

Preferably, the irradiation chamber further comprises a vacuum means for removing gases from the irradiation chamber.

Other features and advantages of the invention will be set forth in, or apparent from, the detailed description of the preferred embodiments of the invention which is found hereinbelow.

DESCRIPTION OF THE PREFERRED EMBODIMENTS

Figure 1:
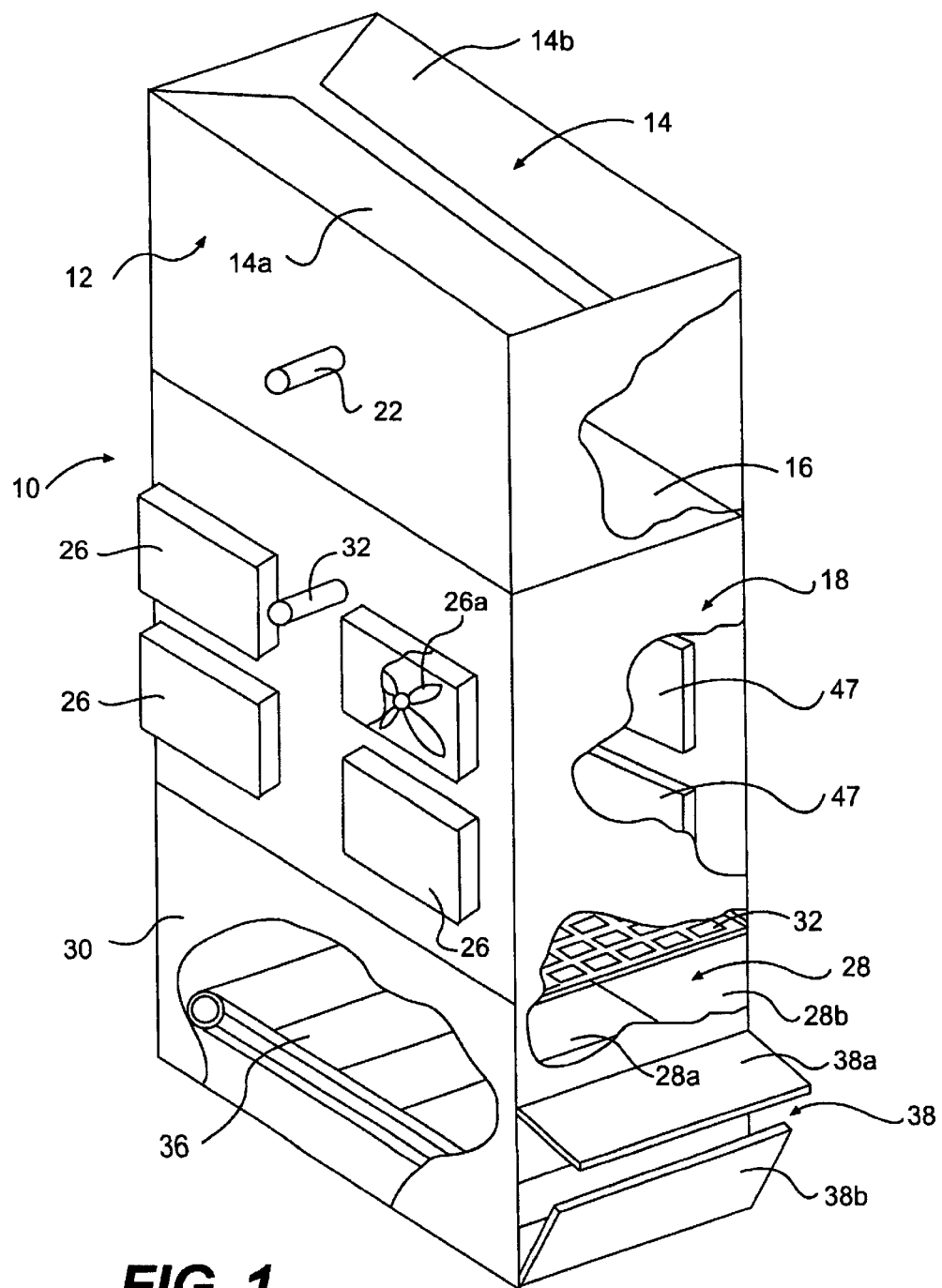
FIG. 1 is a schematic perspective view of a microwave distillation apparatus constructed in accordance with a preferred embodiment of the invention.
Figure 2:
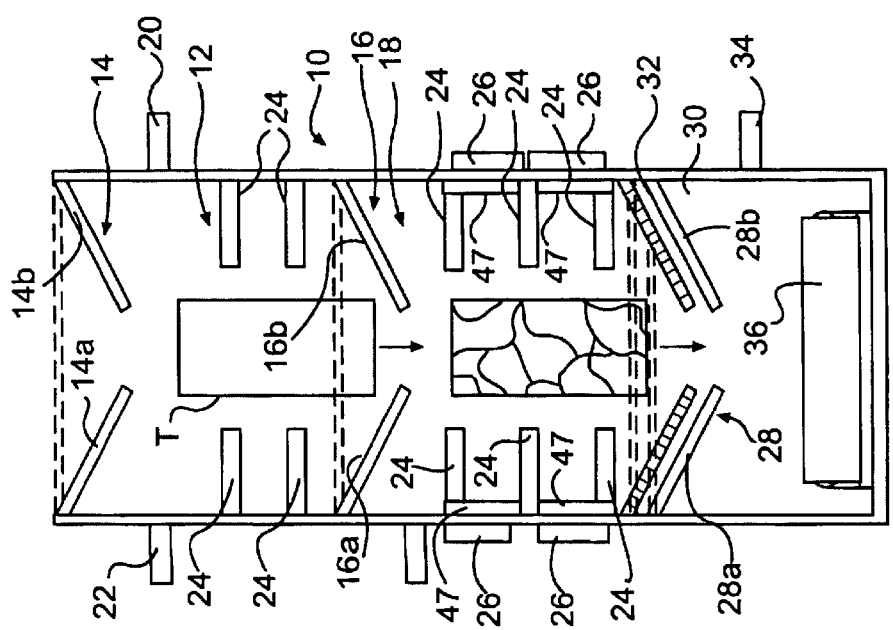
FIG. 2 is a schematic transverse cross section, drawn to smaller scale, of the apparatus of FIG. 1, showing, in a highly stylized manner, the operation of the delivery gates between chambers.

Referring to FIG. 1, a schematic perspective view is shown of a microwave distillation device of apparatus constructed in accordance with a preferred embodiment of the invention for reducing whole tires to constituent components including carbon black, oil, steel (from belting) and the like. The device, which is generally denoted 10, includes, as is also shown in FIG. 2, an upper purge-preheat chamber 12. An input gate, indicated schematically at 14 and shown as formed by a pair of inwardly opening doors 14a and 14b, controls access to chamber 12. In accordance with one preferred embodiment, gate 14 is formed by a sealing door assembly such as used on a submarine while in an alternative preferred embodiment, sliding doors are used.

A similar output gate 16, comprising doors 16a and 16b (only a portion of which can be seen in FIG. 1), permits a tire T (see FIG. 2) received in chamber 12 to exit therefrom into an irradiation chamber 18 disposed therebelow and described in more detail hereinafter. While a tire T is in purge-preheat chamber 12, the tire is preheated by heat from irradiation chamber 18 which is conducted through the lower, interconnecting gate 16 of chamber 12. In particular, the tire is preheated by resulting hot convection currents produced by the heat from chamber 18. The temperature in chamber 12 is limited to about 250° F. in order to avoid pyrolysis of a tire in chamber 12. In addition, nitrogen, $CO_2$ or a like gas is introduced into chamber 12 through an inlet port 20 (not shown in FIG. 1) to purge oxygen above atmospheric pressure from chamber 12 through an exit port 22.

After the preheating and purge operations described above are completed, lower gate 16 is opened to provide gravity feeding of a tire T from chamber 12 to chamber 18, as is indicated schematically in FIG. 2. When gate 16 is opened, the nitrogen purge in chamber 12 is transferred to chamber 18 because of the positive pressure that is created in purge-preheat chamber 12. As shown in FIG. 2, ceramic rods 24 (not shown in FIG. 1) are used to support a tire in a generally vertical orientation in irradiation chamber 18. In an alternative embodiment shown in FIG. 3, outwardly projecting elongate "runners" or spacers 25, preferably made of polytetrafluoroeythene, are used to provide support of a tire in this generally vertical orientation. As also shown in FIG. 3, the irradiation chamber 18 further includes a ceramic inner wall or lining 27.

When supported generally vertically as described above, the tire is subjected to microwave radiation in a pattern configured to cover the entire tire. A plurality of microwave stirrer boxes 26 are used for this purpose. In one exemplary, advantageous embodiment of the apparatus being described, eight microwave stirrer boxes 26 are used as indicated in FIGS. 1 and 2, with four stirrer boxes 26 being located on each side and with each stirrer covering one-quarter of one side of the tire. In an alternative preferred embodiment shown in FIGS. 3 and 4, two stirrer boxes 26 are located on each side of chamber 18 and are diagonally arranged as shown in FIG. 4.

Figure 5:
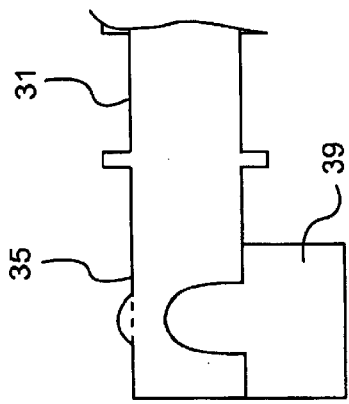
FIG. 5 is a schematic detail of one of the waveguide assemblies of FIG. 4, showing the magnetron source.
Figure 4:
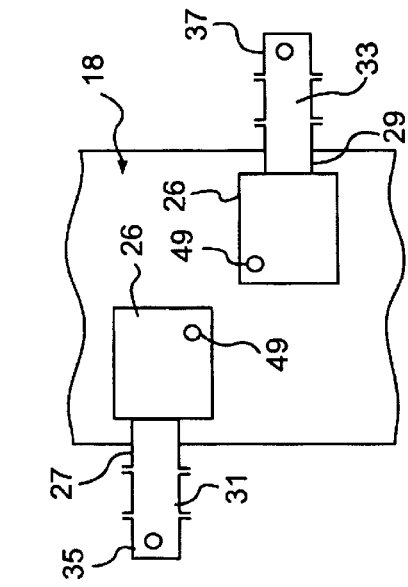
FIG. 4 is a schematic side elevational view, drawn to a different scale, of one embodiment of the waveguide assembly of the pyrolysis apparatus.

As indicated in FIG. 4, in this particular embodiment, the stirrer boxes 26 are fed individually from respective waveguides 27 and 29. Waveguide isolators with dummy loads, indicated at 31 and 33, are also provided between the waveguides 27 and 29 and a pair of respective waveguide launchers 35 and 37. As shown in FIG. 5 for waveguide launcher 35, conventional magnetron 39 is connected thereto which generates the microwave energy. The isolators 31 and 33 are conventional devices used to redirect reflected microwave power into a dummy load, thereby protecting the microwave source, magnetron 39.

Figure 3:
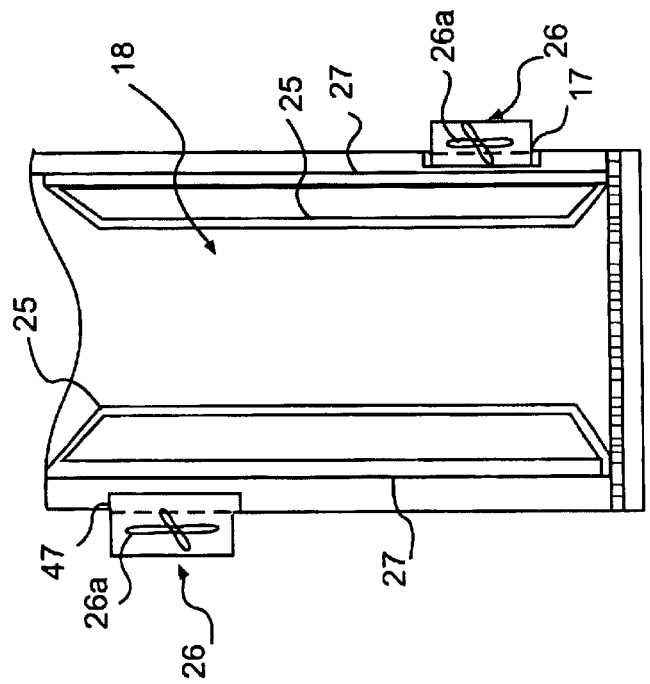
FIG. 3 is a schematic transverse cross sectional view, drawn to a larger scale than FIG. 2, of the irradiation chamber of the distillation apparatus showing an alternative embodiment of the spacer system of FIGS. 1 and 2.

In the embodiment of FIGS. 3 and 4, a single waveguide stirrer 26 is used with each waveguide 27 and 29. In a further preferred embodiment shown in FIG. 6, and which is preferably used with the embodiment of FIGS. 1 and 2, a single waveguide, dual stirrer arrangement is employed wherein a single waveguide 41 is used with two stirrer boxes, indicated at 26, so as to reduce the microwave hardware required. In this embodiment, a magnetron 43 is connected to one end of waveguide 41 and the waveguide separately feeds stirrer boxes 26. The waveguide 41 further includes a stub tuner in the form of a tuning screw 45. The stub tuner 45 is used together with the physical geometry of the waveguides and waveguide posts, indicated at 41a and 41b, to ensure that the microwave energy is distributed evenly to each of the stirrer boxes 26.

Microwave stirrer boxes 26 each include a conventional microwave stirrer 26a in the form of a bladed stirrer device. Stirrers 26a are used to ensure coupling to every mode between the cavity formed by irradiation chamber 18 and the corresponding waveguide opening by continually varying, by deflection, the plane and strength of the microwave excitation. The blades of the stirrers 26a act as re-radiators which continually change the microwave conditions in the chamber 18, and thus, in the ideal use, provide for excitation of every available mode. The stirrers 26a can take a number of different shapes and reference is made, for example, to M. D. Hull and L. J. Thompson, *Designing Microwave Catering Eguipment,* N. V. Philips' Gloeilampenfabrieken, Eindhoven—The Netherlands, May 1971, p. 36, for a further description of suitable microwave stirrer devices.

Figure 6:
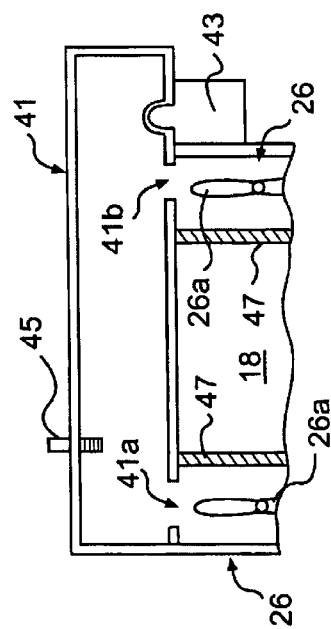
FIG. 6 is a schematic cross sectional view of a single waveguide, dual stirrer embodiment of the waveguide assembly.

As shown in FIGS. 1 and 2 and as can perhaps be best seen in FIGS. 3 and 6, microwave transparent glass or ceramic window 47 is associated with each stirrer box 26 and covers the opening in the chamber wall in which the corresponding stirrer box 26 is mounted or supported. In addition, as is indicated schematically in FIG. 4, an ultrasonic transducer 49 is provided for each stirrer box 26. The purpose of transducers 49 is to provide ultrasonic cleaning of windows 47. It is important to keep windows 47 clean in order to afford effective and efficient coupling of the microwave energy into the irradiation chamber 18.

As described above, the rods 24 of FIGS. 1 and 2 and runners 25 of FIG. 3 serve to support a tire in a generally vertical orientation. However, the rods 24 and runners 25 also serve a second function, viz., that of maintaining some spacing between a tire and the windows 47, thereby preventing a tire from "leaning" directly against a window. This prevents the occurrence of a "hot spot" on a window 47 such as would be produced due to the build up of a carbon deposit caused by direct contact. The rods 24 and runners 25 are dimensioned, i.e., extend outwardly into chamber 18 a sufficient amount, so as to accommodate tires of different widths. Smaller width tires may, of course, "lean" more than wider width tires within the space between the rods or runners but this has not proved to be a problem so long as direct contact with a window is prevented.

The microwave energy coupled from the respective waveguides into irradiation chamber 18 pyrolyses an tire supported in the chamber 18 and results in cracking and distillation of the tire rubber and in separation of the belting from the remainder of the tire material. As discussed above, the tire is supported in a substantially vertical orientation and the microwave energy is directed generally orthogonally to, i.e., at right angles with, the plane of the tire.

Although the present invention is applicable to both steel belted tires and tires with belting other than steel, with steel belted tires the belt is used as a microwave termination or ground so as to minimize the reflected energy. The use of the steel belting as a microwave ground is a function of the vertical orientation of the tire within the radiation chamber 18. The tire rests on the bottom of the chamber and because the steel belt, in this position, is approximately ½ wavelength from the bottom of the chamber 18, due to the outer rubber tread remaining on the tire, grounding of the microwave energy is produced. This result occurs even if there is no rubber left on the tire and the bare steel rests on the bottom of the chamber 18 so that there is metal to metal conduction. If the tire has a full complement of rubber (typically, ¼ to ⅜ inch), the inductive and capacitive properties of a conductor assembly (formed by the steel belt, the insulating rubber and the conductive bottom of the chamber 18) present to the microwave energy a path providing termination of the belt at microwave ground. In general, while there is some difference in the microwave pattern produced with steel belted tires and tires using different belting, the invention works well with both types of tires.

After cracking and distillation of the tire material is complete, the resultant carbon black and steel are fed, by gravity, through a further gate 28, a portion of which is shown in FIG. 1 and which is similar to gates 14 and 16 described above, to a cooling chamber 30 described below. In FIGS. 1 and 2, gate 28 is shown as comprising a pair of doors 28a and 28b. A screen 32 is located a very short distance (e.g., two inches in a preferred embodiment) above gate 28 and constitutes the "bottom" of chamber 18 to which reference was made in the discussions above. Screen 32 services as microwave isolator, while permitting particles to fall therethrough and come to rest on the top of gate 28 prior to opening of the gate. Thus screen 32 allows the microwave energy to be absorbed by the remaining portions of the tire, rather than that which falls through screen 32, thereby providing energy conservation. Screen 32 is constructed of a conductive material, e.g., steel or stainless steel, and the openings therein are less ½ of wavelength, which is approximately ⅛ inch at the wavelengths of interest. Thus, the screen 32 appears as a solid surface to microwave energy at 2.5 GHz.

It has been found that the oil condensate produced in irradiation chamber 18 absorbs microwave energy. The oil mixes with the carbon black and re-evaporates causing a recurring cycle of oil evaporation, condensation of the oil on the walls of chamber 18, the mixture of the oil with the carbon black when the oil runs down the wall, and evaporation of the oil again.

In a preferred embodiment the size of the holes in the microwave screen or shield 32 is decreased so that the oil can drain, but the carbon black is retained on top of the screen 32. It will be appreciated that the screen 32 still acts as a microwave shield, and the oil that drains out of chamber 18 is isolated from the microwave energy in chamber 18. Thus, in contrast to the embodiment described in the preceding paragraph, in this preferred embodiment, the oil condensate drains out through screen 32 while the carbon black stays on top of the screen 32. In a preferred implementation of this embodiment, an oil drain port 50 is provided in the bottom of purge lock gate 28 to drain the oil condensate. A flexible hose 52, which extends through the chamber wall, connects the port 50 to an air tight collector chamber 54.

The oil vapor produced by pyrolysis of a tire is removed from irradiation chamber 18 through an outlet port 34 (see FIG. 2). After the contents of irradiation chamber 18 is transferred, by gravity fed, to cooling chamber 30, gate 28 is closed and provides a purge lock.

A conveyor 36 located in the cooling chamber 30 receives the carbon black and steel, and, after cooling, the carbon-black and steel are removed by conveyor 36 through a purge gate 38 which is similar to those described above but in which a pair of doors or gate members 38a and 38b are horizontally disposed rather than vertically. When open, gate 38 enables discharge of the carbon-black and steel for separation and recycling. After such discharge, gate 38 closes and serves as a purge lock.

The dimensions of the irradiation chamber of cavity 18 are a function of ½ wavelength multiples of the microwave energy. Cavity 18 is preferably designed to be an odd multiple of the wavelength so as to resonate at any dimension required for the load. The preferred microwave frequency is 2.4 GHz. A voltage standing wave ratio (VSWR) of 3.5 to 1 is the ideal ratio of power out to reflected power in. A typical VSWR is usually less than this value but is considerably higher than a shorted condition (wherein all power is reflected back to the source). A VSWR of significantly less than 3.5 to 1 can be tolerated with the apparatus of the invention when isolators, as described above, are used to accommodate for accidental misloading such as might occur as the result of a screw or nail in the tire to be processed.

Although the present invention has been described to specific exemplary embodiments thereof, it will be understood by those skilled in the art that variations and modifications can be effected in these exemplary embodiments without departing from the scope and spirit of the invention.

What is claimed is:

1. A microwave distillation apparatus for providing destructive distillation of whole waste tires, said apparatus comprising:
   a housing comprising a plurality of chambers, said chambers including a preheat chamber for providing preheating of a whole waste tire received therein, and an irradiation chamber, thermally coupled to said preheat chamber such that heat generated in said irradiation chamber produces heat in said preheat chamber, for receiving a preheated whole waste tire from said preheat chamber;
   said apparatus further comprising microwave energy supply means for supplying microwave energy to said irradiation chamber to provide destructive distillation of a preheated whole waste tire received in said irradiation chamber, said microwave energy supply means comprising at least first and second microwave sources positioned on opposite sides of said irradiation chamber for directing microwave energy into said irradiation chamber so as to irradiate both sides of the tire received in said irradiation chamber, said chambers further comprising a cooling chamber, located below said irradiation chamber, for receiving by-products of said destructive distillation and for providing delivery of said by-products from said housing, and said chambers being vertically arranged.

2. A microwave distillation apparatus as claimed in claim 1 further comprising gate means for providing gravity feeding of tires from said preheat chamber to said irradiation chamber.

3. A microwave distillation apparatus as claimed in claim 2 wherein said gate means comprises a gate assembly providing a purge lock between said preheat chamber and said irradiation chamber.

4. A microwave distillation apparatus as claimed in claim 1 wherein said preheat chamber includes means for supplying a purge gas under a pressure above atmospheric pressure to said preheat chamber.

5. A microwave distillation apparatus as claimed in claim 4 wherein said purge gas comprises nitrogen.

6. A microwave distillation apparatus as claimed in claim 5 further comprising means for maintaining said irradiation chamber at a pressure below that in said preheat chamber prior to the receipt of a tire therein from said preheat chamber so that said purge gas is transferred to said irradiation chamber when a tire is received therein.

7. A microwave distillation apparatus as claimed in claim 1 wherein said irradiation chamber comprises a tuned cavity.

8. A microwave distillation apparatus as claimed in claim 7 wherein said irradiation chamber includes at least one microwave transparent window therein through which said microwave energy is transmitted.

9. A microwave distillation apparatus as claimed in claim 8 further comprising cleaning means mounted on said irradiation chamber for removing contaminants from said at least one window.

10. A microwave distillation apparatus as claimed in claim 9 wherein said cleaning means comprises ultrasonic cleaning means for providing vibratory cleaning of said at least one window.

11. A microwave distillation apparatus as claimed in claim 1 wherein said microwave energy supply means comprises at least one waveguide having an output end terminating at a wall of said irradiation chamber, a microwave stirrer located at said output end of said at least one waveguide, and a microwave transparent window in said wall through which microwave energy is coupled from said waveguide into said irradiation chamber.

12. A microwave distillation apparatus as claimed in claim 11 wherein said housing includes four microwave transparent windows in each of two opposite sides of said irradiation chamber and a microwave stirrer associated with each of said windows such that each said stirrer covers one-fourth of one side of the tire.

13. A microwave distillation apparatus as claimed in claim 1 wherein said irradiation chamber includes means for supporting a tire substantially vertically therein so as to define a vertical plane and wherein said microwave energy supply means transmits microwave energy substantially at a right angle to said vertical plane.

14. A microwave distillation apparatus as claimed in claim 13 wherein said irradiation chamber includes a conductive bottom support member on which a tire received in said irradiation chamber is supported so that belting of a belted tire received in said irradiation chamber is spaced from said bottom support member by any tread remaining on the tire.

15. A microwave distillation apparatus as claimed in claim 14 wherein said support member comprises a porous microwave shield for blocking the passage of said microwave energy to thereby assist in confining of said microwave energy within said irradiation chamber while permitting solid by-products of less than a predetermined size to pass therethrough.

16. A microwave distillation apparatus as claimed in claim 14 further comprising a purge lock gate assembly disposed below said microwave shield.

17. A microwave distillation apparatus as claimed in claim 1 wherein said irradiation chamber further comprises a vacuum means for removing gases from said irradiation chamber.

18. A microwave distillation apparatus as claimed in claim 1 wherein said cooling chamber includes a closeable input opening in communication with said irradiation chamber, a closeable discharge opening and a conveyor for receiving said by-products from said irradiation chamber, and for conveying said by-products received thereby to said discharge opening.

19. A microwave distillation apparatus as claimed in claim 18 wherein said discharge opening comprises a purge gate for, when open, providing discharge of said by-products.

20. A microwave distillation apparatus as claimed in claim 18, wherein said cooling chamber further includes means for removing fluids associated with said by-products from said cooling chamber.

21. A microwave distillation apparatus for providing destructive distillation of whole waste tires, said apparatus comprising:

a housing comprising a plurality of chambers, said chambers including a preheat chamber for providing preheating of a whole waste tire received therein, and an irradiation chamber, located below said preheat chamber and thermally coupled to said preheat chamber such that heat generated in said irradiation chamber produces heat in said preheat chamber, for receiving a preheated whole waste tire from said preheat chamber;

said apparatus further comprising microwave energy supply means for supplying microwave energy to said irradiation chamber to provide destructive distillation of a preheated whole waste tire received in said irradiation chamber, said irradiation chamber including means for supporting the tire substantially vertically therein so as to define a vertical plane and said microwave energy supply means transmitting microwave energy substantially at a right angle to said vertical plane.

22. A microwave distillation apparatus as claimed in claim 21 wherein said microwave energy supply means comprises at least one waveguide having an output and terminating at a wall of said irradiation chamber, a microwave stirrer located at said output end of said at least one waveguides, and a microwave transparent window in said wall through which microwave energy is coupled from said at least one waveguide into said irradiation chamber.

23. A microwave distillation apparatus as claimed in claim 21 wherein said microwave energy supply means comprises at least first and second waveguides positioned on opposite sides of said irradiation chamber for directing microwave energy into said irradiation chamber so as to irradiate both sides of the tire received in said irradiation chamber.

* * * * *

UNITED STATES PATENT AND TRADEMARK OFFICE
CERTIFICATE OF CORRECTION

PATENT NO. : 7,101,464 B1
APPLICATION NO. : 08/853604
DATED : September 5, 2006
INVENTOR(S) : Joe Allen Pringle It is certified that error appears in the above-identified patent and that said Letters Patent is hereby corrected as shown below:

Title Page

Please amend item "(73)" as follows:

(73) Assignee: The Tire [Chief] <u>Chef</u>, Inc., Lubbock, TX (US)

Signed and Sealed this

Eleventh Day of November, 2008

JON W. DUDAS
*Director of the United States Patent and Trademark Office*